United States Patent [19]

Wood

[11] Patent Number: 4,925,074

[45] Date of Patent: May 15, 1990

[54] WELDING TOOL

[75] Inventor: Jerry W. Wood, Charlotte, N.C.

[73] Assignee: Electric Power Research Institute, Inc., Palo Alto, Calif.

[21] Appl. No.: 341,924

[22] Filed: Apr. 21, 1989

[51] Int. Cl.$^5$ .............................................. B23K 37/04
[52] U.S. Cl. .................................. 228/49.1; 228/49.3; 228/57; 269/43; 33/645
[58] Field of Search ................... 228/103, 49.1, 49.3, 228/245, 246, 215, 216, 57; 269/43; 33/645, 534, 833

[56] References Cited

U.S. PATENT DOCUMENTS

| | | | |
|---|---|---|---|
| 1,981,850 | 11/1934 | Fisher | 228/246 |
| 2,646,995 | 7/1953 | Thompson | 228/246 |
| 3,033,145 | 5/1962 | Thielsch | 228/246 |
| 3,869,801 | 3/1975 | Lycan | 33/645 |
| 4,161,068 | 7/1979 | McMaster | 33/645 |
| 4,496,093 | 1/1985 | Taylor, Jr. | 269/43 |

Primary Examiner—Richard K. Seidel
Assistant Examiner—Samuel M. Heinrich
Attorney, Agent, or Firm—James B. Hinson

[57] ABSTRACT

The invention provides a tool useful as an aid in joining pipes by welding. The tool includes means for positioning and holding an insert ring in a predetermined position with respect to the end of a pipe while the insert ring is tack-welded to an end of the pipe. Means is also included permitting the ends of the pipe to be welded to be aligned.

9 Claims, 2 Drawing Sheets

WELDING TOOL

BACKGROUND OF INVENTION

1. Field of Invention

The invention relates to tooling and more specifically to a tool for installing insert rings and aligning pipes to be joined by welding.

2. Summary of the Prior Art

Joining of pipes using multi-path welding techniques presents many complex problems. The goal is to produce a weld having mechanical properties, such as yield strength, at least equal to the remainder of the pipe. This goal is not achievable using current techniques.

Problems common to all current pipe welding processes include stresses induced by welding, incomplete fusion of the welding material with the pipe and uneven interior surfaces. The use of insert rings is one technique currently used to improve the characteristics of welds.

Typically, the two ends of the pipe to be joined together are beveled and an insert ring positioned between the two ends prior to the first welding pass. Tack welding at a plurality of radially spaced locations is used to hold the insert ring in position. During the first welding pass, the insert ring is melted and fuses with the two ends of the pipe to form a relatively smooth interior surface. Successfully joining two ends of the pipe using this technique requires that the insert ring and the two ends of the pipe be properly prepared and aligned and the insert ring tack welded, as described above, prior to the first welding pass.

Considerable effort has been devoted to solving the above discussed problems. Typical prior art welding processes are summarized in the following patents which were noted during a prior art search related to the present invention.

U.S. Pat. No. 4,625,414 discloses a gage for holding insert rings in position while they are tack-welded in place. Automatic methods for welding the ends of two pipes together are illustrated in U.S. Pat. No. 4,213,555. Alignment of the ends of a pipe using an alignment ring inserted into the interior of the pipe are illustrated in U.S. Pat. No. 3,960,311.

U.S. Pat. No. 3,910,481 discloses backup tools adapted for insertion into tubular pipes to be drawn together by welding. Clamping techniques for holding first and second sections of pipe in a fixed position as they are welded together in end-to-end relationship is illustrated in U.S. Pat. No. 3,901,497.

Techniques for controlling the shape of cylindrical structures during welding are illustrated in U.S. Pat. No. 3,149,597. Centering rings for aligning a backup ring is illustrated in U.S. Pat. No. 3,101,532. Techniques useful in welding pipes are further illustrated by U.S. Pat. No. 2,449,371, U.S. Pat. No. 3,002,191, and U.S. Pat. No. 2,584,072.

SUMMARY OF THE INVENTION

The invention provides a multi-purpose tool useful in joining pipes by welding using an insert ring. More specifically, the present invention provides a multi-function tool for holding an insert ring in position while it is tack-welded, for aligning the two ends of the pipe prior to welding and for checking the ends of the pipe to be joined to determine if they are beveled at the proper angle.

DETAILED DESCRIPTION

Figure 1:
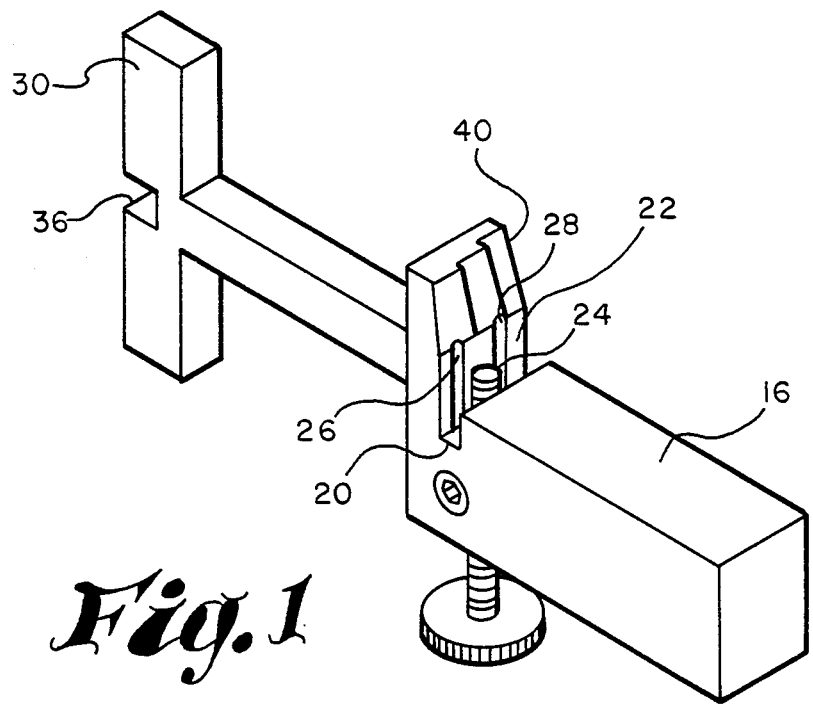
FIG. 1 is an isometric drawing of the tool comprising the invention.

FIG. 1 is an isometric drawing of a first embodiment of the invention. The utilization of the tool to tack-weld an insert ring 12 to the beveled end of a pipe 14 is illustrated in FIG. 2.

More specifically, the tool includes a first substantially flat surface 16 which is positioned adjacent the interior surface 18 of the pipe. The insert ring 12 is positioned in a first notch 20 and against a second substantially flat surface 22. An insert ring positioner consisting of a screw member 24 is adjusted to position the insert ring 12 in the desired position with respect to the end of the pipe 14. When so positioned the insert ring 12 is tack welded to the end of the pipe 14 to hold the insert ring 12 in the desired position. This process is repeated at a plurality of positions around the end of the pipe to attach the insert ring 12 to the tapered surface 14 of the pipe.

Figure 2:
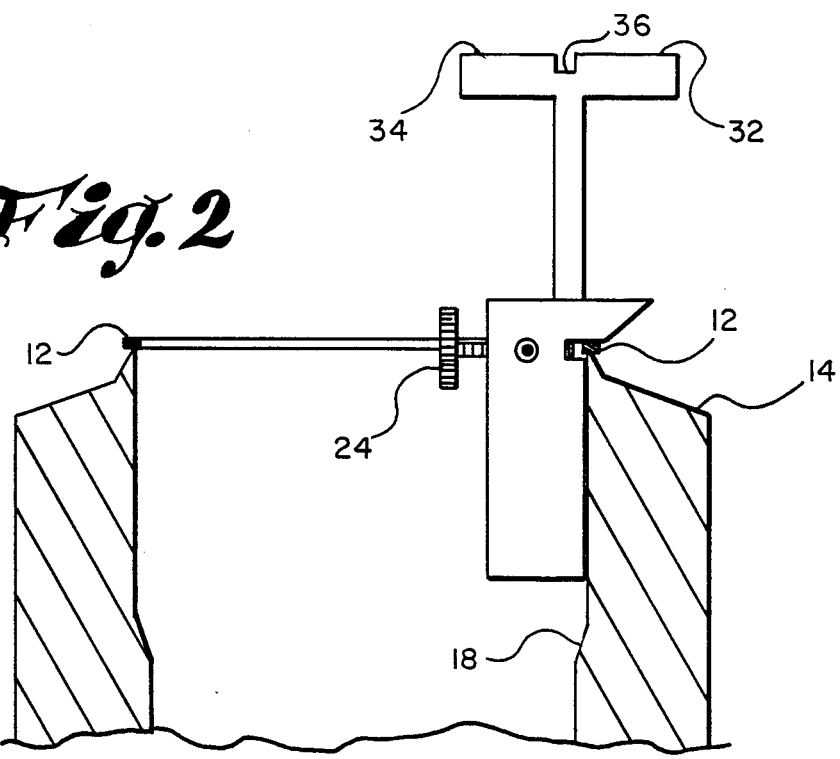
FIG. 2 is a drawing illustrating the use of the tool to position an insert ring at the desired location with respect to an end of a pipe.

When the tool is positioned, as illustrated in FIG. 2, the flat surface 16 of the tool is held against the interior surface 18 of the pipe using any convenient means. One suitable means is to use conventional "c" clamps (not illustrated) for this purpose.

In many applications insert rings of this type are used in conjunction with welding of stainless steel pipes. This requires that the welding be carried out in a protective atmosphere such as an inert gas like argon. To aid in the inert gas flowing by the insert ring 12, first and second grooves 26 and 28 are provided.

After the insert ring 12 has been attached to one end of the pipe 14, it is necessary to properly align the two ends of the pipe. To aid in accomplishing this task the tool includes a second portion 30, having substantially flat end portions and separated by a centrally located notch 36.

Figure 3:
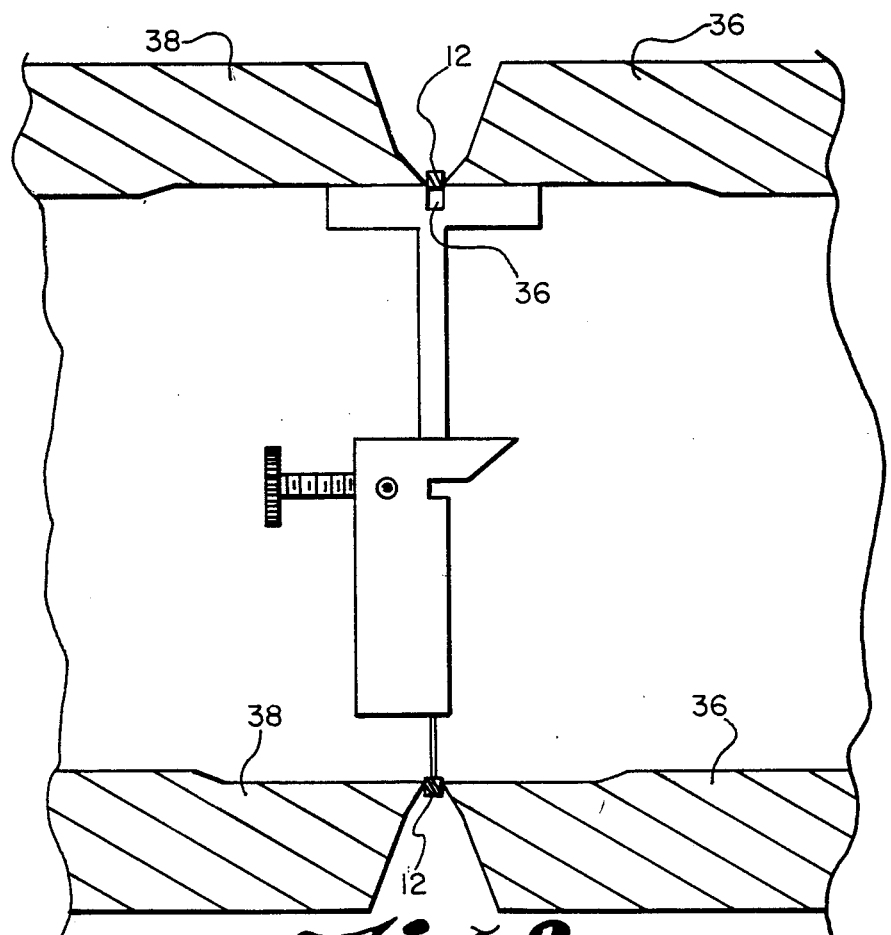
FIG. 3 is a drawing illustrating the use of the tool to align the two ends of a pipe.

FIG. 3 illustrates the utilization of the tool to align the first and second ends 36 and 38 of the pipe. More specifically, the substantially flat end portions are positioned adjacent the interior surface of the ends 36 and 38, with the insert ring 12 positioned in the notch 36. In this position the ends of the pipe are adjusted to be substantially even as illustrated in FIG. 3. This checking and alignment procedure is performed at a plurality of locations around the pipe to be sure that the pipe ends 34 and 36 are properly aligned in all directions. In aligning the two ends of the pipe, 36 and 38, the tool can be held in the proper position using any convenient means (not illustrated).

Multi-pass welding requires that the ends of the pipe be beveled to provide access to the area to be welded. This is part of the pipe preparation process referred to previously. If the angle of the bevel is too high (with respect to the longitudinal axis of the pipe) insufficient access to the weld is provided. Conversely, if the angle is to low excess fill material is required resulting in an increase in weld induced stress and other defects associated with the welding cycle. In selecting a bevel angle, the best compromise between these conflicting parameters is sought.

Figure 4:
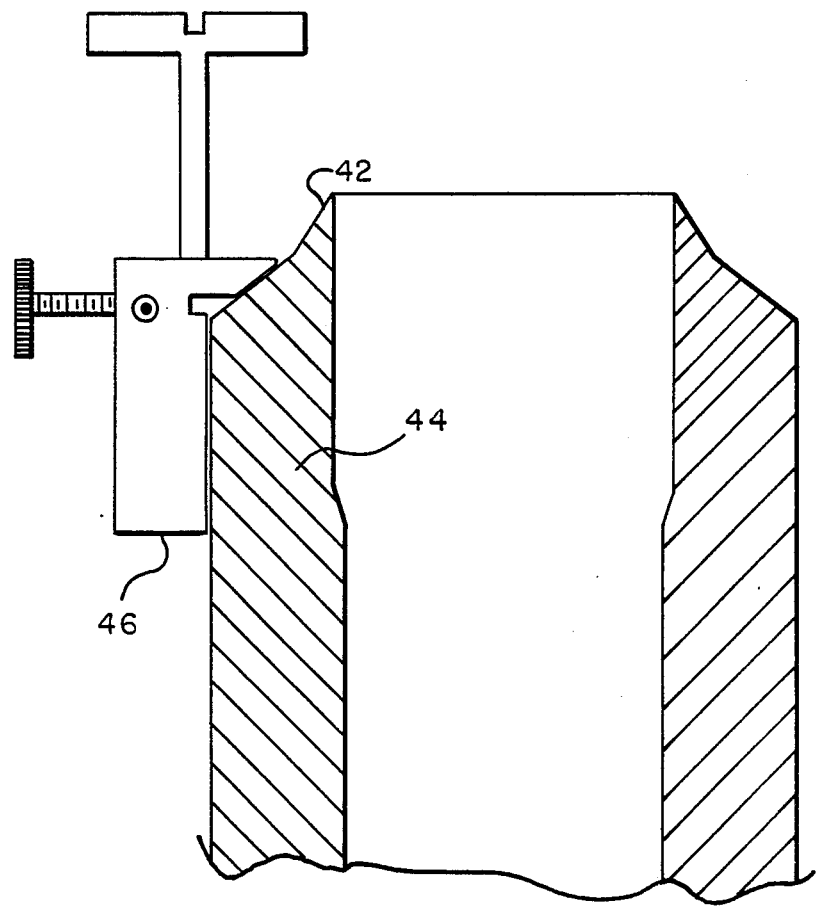
FIG. 4 is a drawing illustrating the use of the tool to check the bevel of the end of a pipe to be welded.

In securing proper welding it is necessary that the end portions of the pipe be beveled at the correct angle. To assist in checking the ends of the pipe for the desired bevel angle, the tool includes a sloped-edge surface 40 which mates with the end of the pipe section 44 when the tool is positioned as indicated in FIG. 4.

I claim:

1. A tool for use in joining first and second ends of tubular members by welding using an insert ring, each of said first and second ends including an interior surface, said tool including a first surface for sequentially positioning at a plurality of locations in contact with said interior surface and adjacent said first end, a second surface extending radially outward and adjusting means for supporting said insert ring between said first end and said second surface at a predetermined radial position permitting said insert ring to be tack-welded to said first end at each of said plurality of locations; and a third surface including first and second aligned portions joined by a notched portion permitting said third surface to be sequentially positioned at a plurality of locations interior to said first and second ends such that said first and second aligned portions are respectively adjacent said interior surface of said first and second ends with said insert ring extending into said notched portion to permit said first and second ends to be checked for proper alignment prior to welding.

2. A tool in accordance with claim 1 further including means facilitating the flow of an inert gas around the edges of said insert ring as said insert ring is welded to an end of said tubular member.

3. A tool in accordance with claim 2 wherein said means for facilitating the flow of an inert gas around the edges of said insert ring comprises at least one groove in said second surface.

4. A tool in accordance with claim 3 further including a fourth surface positioned at a predetermined angle with respect to said first surface permitting said tool to be used to check the bevel angle of the end of said tubular member.

5. A tool in accordance with claim 4 wherein said adjusting means includes screw means adjustable to position said insert ring at the desired position.

6. A tool in accordance with claim 5 wherein said means for facilitating the flow of an inert gas comprises a plurality of grooves.

7. A tool for use in joining first and second ends of tubular members by welding using an insert ring, each of said first and second ends having an interior surface, said tool including a first surface for sequentially positioning at a plurality of locations in contact with said interior surface adjacent said first end, a second surface extending radially outward and adjusting means for supporting said insert ring between said first end and said second surface at a predetermined radial position permitting said insert ring to be tack-welded to said first end at each of said plurality of locations, said second surface also including a plurality of grooves permitting an inert gas supplied by welding apparatus to flow around said insert ring; and a third surface including first and second aligned portions joined by a notched portion permitting said third portion to be sequentially positioned at a plurality of locations interior to and in contact with said first and second ends such that said first and second portions are respectively in contact with said interior surface of said first and second ends with said insert ring extending into said notched portion to permit said first and second ends to be checked for proper alignment prior to welding.

8. A tool in accordance with claim 7 further including means for measuring the bevel angle of said tubular member.

9. A tool in accordance with claim 8 wherein said adjusting means includes a manually operated screw positioned between said first and second surfaces.

* * * * *